(12) United States Patent
Mu et al.

(10) Patent No.: US 11,933,928 B1
(45) Date of Patent: Mar. 19, 2024

(54) FORWARD SIMULATION-BASED IRREGULAR SEISMIC DATA ACQUISITION METHOD

(71) Applicant: Institute of Geology and Geophysics, Chinese Academy of Sciences, Beijing (CN)

(72) Inventors: Shengqiang Mu, Beijing (CN); Shoudong Huo, Beijing (CN); Guoxu Shu, Beijing (CN); Xuhui Zhou, Beijing (CN); Jiaru Zou, Beijing (CN); Liang Huang, Beijing (CN)

(73) Assignee: Institute of Geology and Geophysics, Chinese Academy of Sciences, Beijing (CN)

( * ) Notice: Subject to any disclaimer, the term of this patent is extended or adjusted under 35 U.S.C. 154(b) by 0 days.

(21) Appl. No.: 18/188,603

(22) Filed: Mar. 23, 2023

(30) Foreign Application Priority Data

Mar. 28, 2022 (CN) .......................... 202210308425.3

(51) Int. Cl.
*G01V 1/28* (2006.01)
*G06F 17/14* (2006.01)
(52) U.S. Cl.
CPC ............ *G01V 1/282* (2013.01); *G06F 17/141* (2013.01)
(58) Field of Classification Search
CPC .............................. G01V 1/282; G06F 17/141
See application file for complete search history.

(56) References Cited

U.S. PATENT DOCUMENTS

| 10,386,511 | B2 * | 8/2019 | Routh | G01V 1/003 |
| 2018/0335536 | A1 * | 11/2018 | Li | G01V 1/368 |
| 2019/0293813 | A1 * | 9/2019 | Li | G01V 1/36 |

OTHER PUBLICATIONS

CN language Search Report dated May 13, 2022 in application No. 202210308425.3.
English language translation of Search Report dated May 13, 2022 in CN application No. 2022103084253.
CN language Notice of Allowance dated May 13, 2022 issued in application No. 202210308425.3.
English language translation of Notice of Allowance dated May 13, 2022 issued in CN application No. 202210308425.3.

* cited by examiner

*Primary Examiner* — John E Breene
*Assistant Examiner* — Yaritza H Perez Bermudez

(57) ABSTRACT

An irregular seismic data collection method is based on forward modeling. The method includes: fully collecting geological information of a work area to build a geological model, determining arrangement parameters of receiver points and shot points for regular high-density collection and irregular sparse collection, performing irregular optimization design on positions of the shot points based on forward modeling, performing irregular optimization design on positions of the receiver points based on forward modeling, and outputting a preferred irregular sparse observation system. Compared with the existing technologies, an arrangement scheme of shot points and receiver points in the present invention, including the irregular sparse observation system, implements irregular optimization design of the shot points and the receiver points based on a forward modeling technology by using a greedy strategy, so that the designed irregular observation system can suppress to the greatest extent spatial aliasing caused by irregular sparse collection.

1 Claim, 15 Drawing Sheets

FORWARD SIMULATION-BASED IRREGULAR SEISMIC DATA ACQUISITION METHOD

TECHNICAL FIELD

The present invention relates to the technical field of seismic exploration, and specifically to an irregular seismic data collection method based on forward modeling.

BACKGROUND ART

Seismic exploration technology is the most effective geophysical prospecting method for oil and natural gas. With constant deepening of seismic exploration research, exploration targets and environments become increasingly complicated, and lithologic reservoirs and fractured reservoirs are targeted instead of previous simple structural reservoirs. To obtain better exploration effects in this case, high-density seismic data collection is required, but great increases in collection cost and collection time are accompanied. In addition, field collection environments become increasingly complicated. Receiver points and shot points cannot be arranged regularly due to obstacles such as mountains, lakes, roads and villages. Insufficient spatial collection easily leads to aliasing, which affects subsequent processing and interpretation of seismic data. Emergence of the compressive sensing theory provides an effective solution to address the above-mentioned problems. The obstacles can be effectively avoided by optimized design of an irregular sparse observation system. Then, regular high-density seismic data are reconstructed by solving a sparse constrained optimization problem. Accordingly, regular high-density seismic data are obtained with relatively low collection cost.

Since the compressive sensing theory was introduced into seismic exploration, researchers have put forward a series of irregular seismic data collection schemes, including jitter sampling, segmented random sampling, irregular optimal sampling, Poisson disk sampling, and the like. However, these irregular seismic data collection technologies did not consider actual underground structure information. Therefore, for a work area, the irregular observation system designed by using these irregular seismic data collection technologies may not be able to fully collect underground information of the work area.

Therefore, it is necessary to design an irregular seismic data collection method based on forward modeling, in which an accurate geological model of a work area is built by fully collecting geological information of the work area, then optimized design of an irregular seismic observation system is performed based on a high-precision seismic forward modeling technology by using a greedy strategy, and spatial aliasing caused by sparse collection is suppressed to the greatest extent through random arrangement of sampling points, so that the designed irregular sparse observation system can collect underground information of the work area to the greatest extent with as few sampling points as possible.

SUMMARY

The purpose of the present invention is to overcome the deficiencies of the existing technologies and provide an irregular seismic data collection method based on forward modeling, in which an accurate geological model of a work area is built by fully collecting geological information of the work area, then optimized design of an irregular seismic observation system is performed based on a high-precision seismic forward modeling technology by using a greedy strategy, and spatial aliasing caused by sparse collection is suppressed to the greatest extent through random arrangement of sampling points, so that the designed irregular sparse observation system can collect underground information of the work area to the greatest extent with as few sampling points as possible.

To achieve the above purpose, the present invention provides an irregular seismic data collection method based on forward modeling, including the following steps:

S1: fully collecting geological information of a work area to build a geological model:

collecting previous geological and geophysical exploration data, obtaining underground information of the work area such as formation velocity, geological structure, anisotropy, and absorption attenuation by using logging data and gravity, magnetic, electrical, and seismic data, and building a high-precision geological model to guarantee accuracy of subsequent forward modeling of seismic data;

S2: determining arrangement parameters of receiver points and shot points for regular high-density collection and irregular sparse collection:

determining arrangement ranges and quantities of the receiver points and the shot points for regular high-density collection, and arrangement ranges, disturbance ranges, quantities, numbers of grids and spacing between the grids of the receiver points and the shot points for irregular sparse collection, and using all the grids as candidate excitation points or sampling points;

S3: performing irregular optimization design on positions of the shot points based on forward modeling:

performing the irregular optimization design on the positions of the shot points based on a high-precision seismic forward modeling technology by using a greedy strategy, to decompose a global optimization problem of arrangement of the shot points into local optimization problems of single shot points, where specific steps are as follows:

S301: arranging a receiver point in a center of the arrangement range of the receiver points;

S302: arranging regular high-density shot points in the arrangement range of the shot points, obtaining a regular high-density common receiver point gather $D1_{crp}$ by using the forward modeling technology, and computing a frequency-wavenumber spectrum $FK1_{crp}$ corresponding to the $D1_{crp}$;

due to regular distribution of temporal sampling points and spatial sampling points of the common receiver point gather corresponding to distribution of the regular high-density shot points, performing discrete uniform Fourier transform on a spatial direction of the $D1_{crp}$ according to the following formula to obtain time-wavenumber domain data $TK1_{crp}$:

$$TK1_{crp}(t, k) = \sum_{n=1}^{N-1} D1_{crp}(t, n\Delta x)e^{jkn\Delta x}\Delta x$$

where N is a dimension in the spatial direction; then performing discrete uniform Fourier transform on a temporal direction of the time-wavenumber domain data $TK1_{crp}$ according to the following formula to obtain the frequency-wavenumber domain data $FK1_{crp}$:

$$FK1_{crp}(f, k) = \sum_{m=1}^{M-1} TK1_{crp}(m\Delta t, k)e^{jfm\Delta t}\Delta t$$

where M is a dimension in the temporal direction;

S303: arranging the shot points uniformly in the arrangement range of the shot points according to a set quantity of irregular sparse collection shot points, enabling each shot point to traverse all candidate grids in the disturbance range of the shot points in turn, obtaining a common receiver point gather $D2_{crp}$ corresponding to current distribution of the shot points in each disturbance by using the forward modeling technology, and computing a frequency-wavenumber spectrum $FK2_{crp}$ corresponding to the $D2_{crp}$, where specific steps are as follows:

due to uniform temporal sampling points and non-uniform spatial sampling points of the common receiver point gather $D2_{crp}$ obtained by the forward modeling of irregular distribution of the shot points, performing discrete non-uniform Fourier transform on a spatial direction of the $D2_{crp}$ according to the following formula to obtain time-wavenumber domain data $TK2_{crp}$:

$$TK2_{crp}(t, k) = \sum_{n=0}^{N-1} D2_{crp}(t, x_n) e^{jkx_n} \Delta x_n$$

where $$\Delta x_n = \frac{x_{n+1} - x_{n-1}}{2},$$

and N is a dimension in the spatial direction; then performing discrete uniform Fourier transform on a temporal direction of the time-wavenumber domain data $TK2_{crp}$ according to the following formula to obtain frequency-wavenumber domain data $FK2_{crp}$:

$$FK2_{crp}(f, k) = \sum_{m=1}^{M-1} TK2_{crp}(m\Delta t, k) e^{jfm\Delta t} \Delta t$$

where M is a dimension in the temporal direction;

using a grid corresponding to a minimum error $\sigma_{crp}$ of the frequency-wavenumber spectrum $FK1_{crp}$ in S302 as an arrangement position of the shot point, where the error $[[\sigma_{crp}]]\sigma_{crp}$ is computed according to the following formula:

$$\sigma_{crp} = \sum_{i=1}^{p} \sum_{j=1}^{q} (FK1_{crp}(i, j) - FK2_{crp}(i, j))^2$$

where p and q are dimensions in a frequency direction and a wavenumber direction of the frequency-wavenumber spectrum, respectively; stopping the disturbances of the shot points when the error cannot be decreased by disturbing any shot point; and S304: outputting preferred irregular arrangement positions of the shot points;

S4: performing irregular optimization design on positions of the receiver points based on forward modeling:

performing the irregular optimization design on the positions of the receiver points based on the high-precision seismic forward modeling technology by using the greedy strategy, to decompose a global optimization problem of arrangement of the receiver points into local optimization problems of single receiver points, where specific steps are as follows:

S401: arranging the shot points in the work area according to the irregular positions of the shot points in S3;

S402: arranging regular high-density receiver points in the arrangement range of the receiver points in the work area, and performing forward modeling for each shot point to obtain a common shot point gather $D1_{csp(s)}$, where s is a serial number of the shot point; and computing a frequency-wavenumber spectrum $FK1_{csp(s)}$ corresponding to each common shot point gather;

due to regular distribution of temporal sampling points and spatial sampling points of the common shot point gather corresponding to distribution of the regular high-density receiver points, performing discrete uniform Fourier transform on a spatial direction of the $D1_{csp(s)}$ according to the following formula to obtain time-wavenumber domain data $TK1_{csp(s)}$:

$$TK1_{csp(s)}(t, k) = \sum_{n=0}^{N-1} D1_{csp(s)}(t, x_n) e^{jkx_n} \Delta x_n$$

where the t is a sequence of the temporal sampling points, the k is a wavenumber, and the x is an arrangement position of a spatial sampling point; then performing discrete uniform Fourier transform on a temporal direction of the time-wavenumber domain data $TK1_{csp(s)}$ according to the following formula to obtain frequency-wavenumber domain data $FK1_{csp(s)}$:

$$FK1_{csp(s)}(f, k) = \sum_{m=1}^{M-1} TK1_{csp(s)}(m\Delta t, k) e^{jfm\Delta t} \Delta t$$

S403: arranging the receiver points uniformly in the arrangement range of the receiver points according to a set quantity of irregular sparse collection receiver points, enabling each receiver point to traverse all candidate grids in the disturbance range of the receiver points in turn, and obtaining a common shot point gather $D2_{csp(s)}$ corresponding to all the shot points under the distribution of the irregular sparse collection receiver points by forward modeling for each transform of the positions of the receiver points, where s is a serial number of a shot point; and computing a frequency-wavenumber spectrum $FK2_{csp(s)}$ corresponding to the $D2_{csp(s)}$, where s is the serial number of the shot point, where specific steps are as follows:

due to uniform temporal sampling points and non-uniform spatial sampling points of the common shot point gather $D2_{csp(s)}$ obtained by forward modeling the irregular distribution of the receiver points, performing discrete non-uniform Fourier transform on a spatial direction of the $D2_{csp(s)}$ according to the following formula to obtain time-wavenumber domain data $TK2_{csp(s)}$:

$$TK2_{csp(s)}(t, k) = \sum_{n=0}^{N-1} D2_{csp(s)}(t, x_n) e^{jkx_n} \Delta x_n$$

where $$\Delta x_n = \frac{x_{n+1} - x_{n-1}}{2};$$

then performing discrete uniform Fourier transform on a temporal direction of the time-wavenumber domain data $TK2_{csp(s)}$ according to the following formula to obtain frequency-wavenumber domain data $FK2_{csp(s)}$:

$$FK2_{csp(s)}(f, k) = \sum_{m=1}^{M-1} TK2_{csp(s)}(m\Delta t, k)e^{jfm\Delta t}\Delta t$$

computing an average value $\sigma_{csp}$ of frequency-wavenumber spectrum errors of the regular high-density common shot point gathers and the irregular sparse common shot point gathers of all the shot points according to the following formula:

$$\sigma_{csp} = \frac{1}{S}\sum_{s=1}^{S}\sum_{i=1}^{p}\sum_{j=1}^{q}(FK1_{csp(s)}(i, j) - FK2_{csp(s)}(i, j))^2$$

where S is a total number of the shot points, and p and q are dimensions in the frequency direction and the wavenumber direction of the frequency-wavenumber spectrum, respectively; using the grid corresponding to a minimum average value as an arrangement position of the receiver point; stopping the disturbances of the receiver points when the average value of the frequency-wavenumber spectrum errors of the regular high-density common shot point gathers and the irregular sparse common shot point gathers of all the shot points cannot be decreased; and S404: outputting preferred irregular arrangement positions of the receiver points; and S5: outputting a preferred irregular sparse observation system:

combining the irregular arrangement positions of the shot points output in S3 and the irregular arrangement positions of the receiver points output in S4 to obtain the irregular sparse observation system including the arrangement parameters of the receiver points and the shot points.

Compared with the existing technologies, an arrangement scheme of shot points and receiver points in the present invention, including the irregular sparse observation system, implements irregular optimization design of the shot points and the receiver points based on the forward modeling technology by using the greedy strategy, so that the designed irregular observation system can suppress to the greatest extent spatial aliasing caused by irregular sparse collection and guarantee effective reconstruction of regular high-density seismic data.

DETAILED DESCRIPTION OF THE EMBODIMENTS

Figure 1:
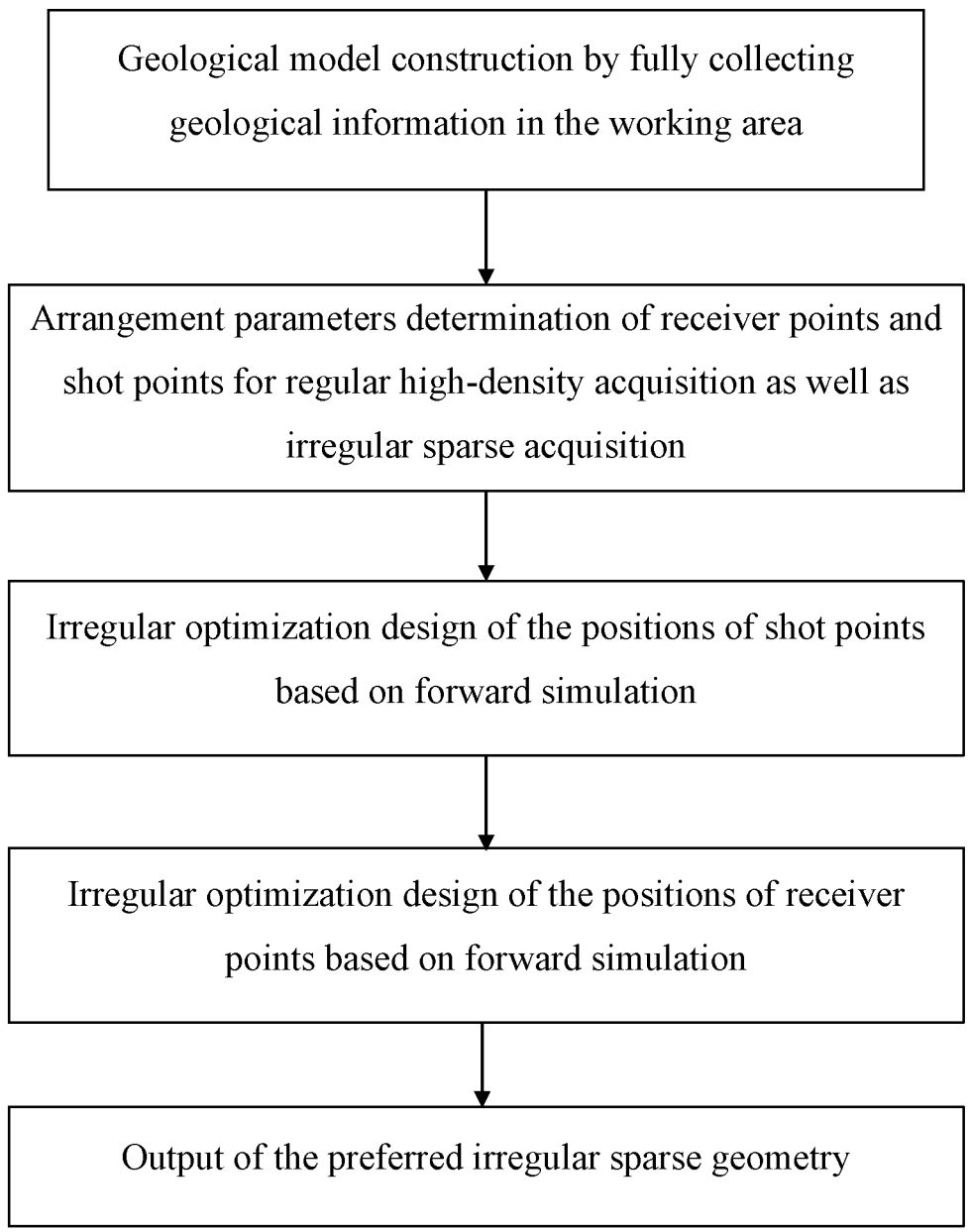
FIG. 1 is a flowchart of an irregular seismic data collection method based on forward modeling.
Figure 2:
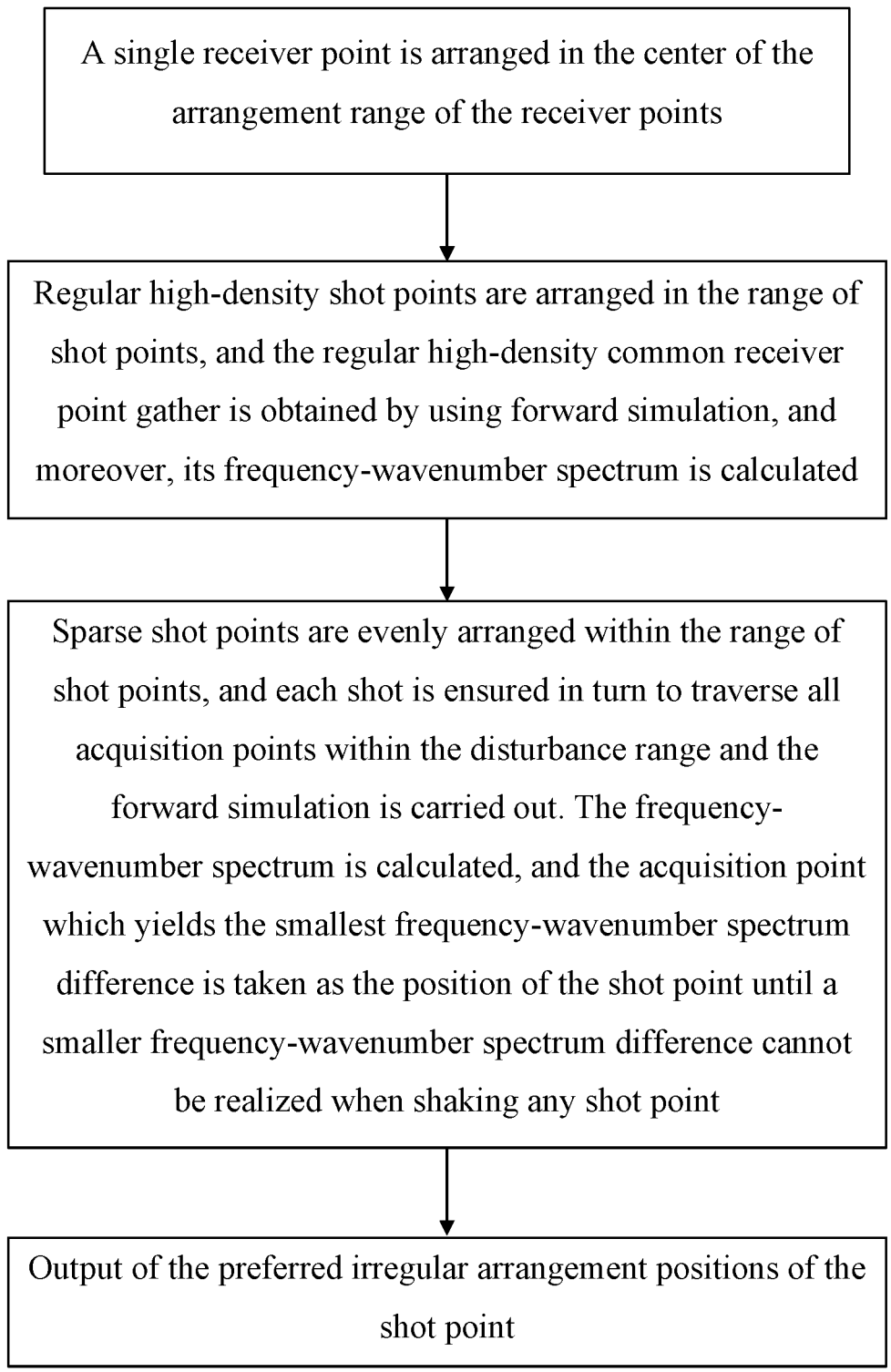
FIG. 2 is a flowchart of irregular optimization design of shot points.
Figure 3:
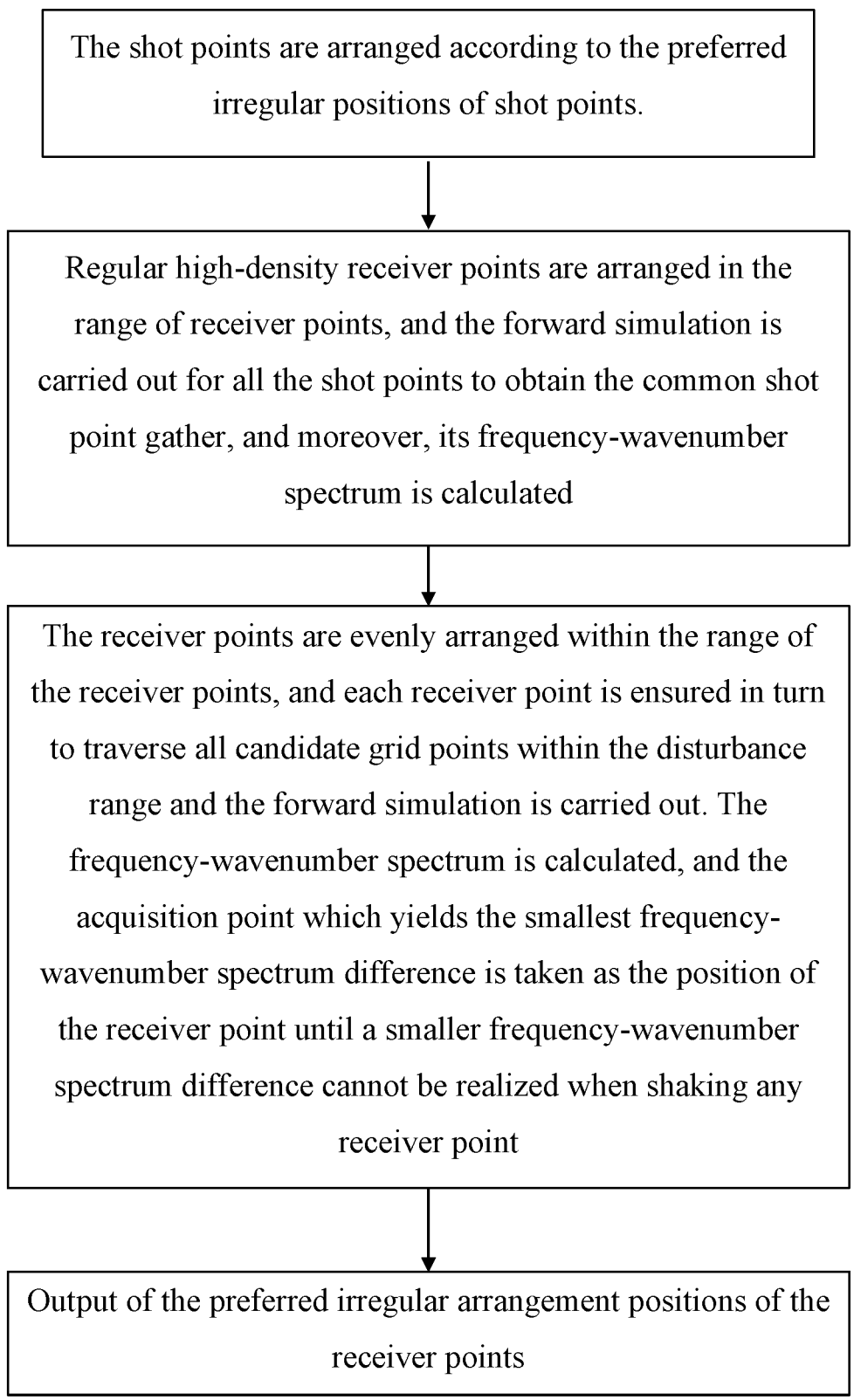
FIG. 3 is a flowchart of irregular optimization design of receiver points.

The present invention is now further described with reference to the accompanying drawings.

The present invention provides an irregular seismic data collection method based on forward modeling.

As shown in FIGS. 1-15, the method includes the following steps:

S1: geological information of a work area is fully collected to build a geological model:

Previous geological and geophysical exploration data are collected, underground information of the work area such as formation velocity, geological structure, anisotropy, and absorption attenuation are obtained by using logging data and gravity, magnetic, electrical, and seismic data, and a high-precision geological model is built to guarantee accuracy of subsequent forward modeling of seismic data;

S2: arrangement parameters of receiver points and shot points for regular high-density collection and irregular sparse collection are determined:

Arrangement ranges and quantities of the receiver points and the shot points for regular high-density collection, and arrangement ranges, disturbance ranges, quantities, numbers of grids and spacing between the grids of the receiver points and the shot points for irregular sparse collection are determined, and all the grids are used as candidate excitation points or sampling points;

S3: irregular optimization design is performed on positions of the shot points based on forward modeling:

The irregular optimization design is performed on the positions of the shot points based on a high-precision seismic forward modeling technology by using a greedy strategy, to decompose a global optimization problem of arrangement of the shot points into local optimization problems of single shot points, where specific steps are as follows:

S301: a receiver point is arranged in a center of the arrangement range of the receiver points;

S302: regular high-density shot points are arranged in the arrangement range of the shot points, a regular high-density common receiver point gather $D1_{crp}$ is obtained by using the forward modeling technology, and a frequency-wavenumber spectrum $FK1_{crp}$ corresponding to the $D1_{crp}$ is computed;

Due to regular distribution of temporal sampling points and spatial sampling points of the common receiver point gather corresponding to distribution of the regular high-density shot points, discrete uniform Fourier transform is performed on a spatial direction of the $D1_{crp}$ according to the following formula to obtain time-wavenumber domain data $TK1_{crp}$:

$$TK1_{crp}(t, k) = \sum_{n=1}^{N-1} D1_{crp}(t, n\Delta x)e^{jkn\Delta x}\Delta x$$

where N is a dimension in the spatial direction; then discrete uniform Fourier transform is performed on a temporal direction of the time-wavenumber domain data $TK1_{crp}$ according to the following formula to obtain the frequency-wavenumber domain data $FK1_{crp}$:

$$FK1_{crp}(f, k) = \sum_{m=1}^{M-1} TK1_{crp}(m\Delta t, k)e^{jfm\Delta t}\Delta t$$

where M is a dimension in the temporal direction;

S303: the shot points are arranged uniformly in the arrangement range of the shot points according to a set quantity of irregular sparse collection shot points, each shot point is enabled to traverse all candidate grids in the disturbance range of the shot points in turn, a common receiver point gather $D2_{crp}$ corresponding to current distribution of the shot points is obtained in each disturbance by using the forward modeling technology, and a frequency-wavenumber spectrum $FK2_{crp}$ corresponding to the $D2_{crp}$ is computed, where specific steps are as follows:

Due to uniform temporal sampling points and non-uniform spatial sampling points of the common receiver point gather $D2_{crp}$ obtained by the forward modeling of irregular distribution of the shot points, discrete non-uniform Fourier transform is performed on a spatial direction of the $D2_{crp}$ according to the following formula to obtain time-wavenumber domain data $TK2_{crp}$:

$$TK2_{crp}(t, k) = \sum_{n=0}^{N-1} D2_{crp}(t, x_n)e^{jkx_n}\Delta x_n$$

where $$\Delta x_n = \frac{x_{n+1} - x_{n-1}}{2},$$

and N is a dimension in the spatial direction; then discrete uniform Fourier transform is performed on a temporal direction of the time-wavenumber domain data $TK2_{crp}$ according to the following formula to obtain frequency-wavenumber domain data $FK2_{crp}$:

$$FK2_{crp}(f, k) = \sum_{m=1}^{M-1} TK2_{crp}(m\Delta t, k)e^{jfm\Delta t}\Delta t$$

where M is a dimension in the temporal direction;

A grid corresponding to a minimum error $\sigma_{crp}$ of the frequency-wavenumber spectrum $FK1_{crp}$ in S302 is used as an arrangement position of the shot point, where the error $\sigma_{crp}$ is computed according to the following formula:

$$\sigma_{crp} = \sum_{i=1}^{p} \sum_{j=1}^{q} (FK1_{crp}(i, j) - FK2_{crp}(i, j))^2$$

where p and q are dimensions in a frequency direction and a wavenumber direction of the frequency-wavenumber spectrum, respectively; the disturbances of the shot points stop when the error cannot be decreased by disturbing any shot point; and S304: preferred irregular arrangement positions of the shot points are output;

S4: irregular optimization design is performed on positions of the receiver points based on forward modeling:

The irregular optimization design is performed on the positions of the receiver points based on the high-precision seismic forward modeling technology by using the greedy strategy, to decompose a global optimization problem of arrangement of the receiver points into local optimization problems of single receiver points. Specific steps are as follows:

S401: the shot points are arranged in the work area according to the irregular positions of the shot points in S3;

S402: regular high-density receiver points are arranged in the arrangement range of the receiver points in the work area, and forward modeling is performed for each shot point to obtain a common shot point gather $D1_{csp(s)}$, where s is a serial number of the shot point; a frequency-wavenumber spectrum $FK1_{csp(s)}$ corresponding to each common shot point gather is computed;

Due to regular distribution of temporal sampling points and spatial sampling points of the common shot point gather corresponding to distribution of the regular high-density receiver points, discrete uniform Fourier transform is performed on a spatial direction of the $D1_{csp(s)}$ according to the following formula to obtain time-wavenumber domain data $TK1_{csp(s)}$:

$$TK1_{csp(s)}(t, k) = \sum_{n=0}^{N-1} D1_{csp(s)}(t, x_n)e^{jkx_n}\Delta x_n$$

The t is a sequence of the temporal sampling points, the k is a wavenumber, and the x is an arrangement position of a spatial sampling point;

Then discrete uniform Fourier transform is performed on a temporal direction of the time-wavenumber domain data $TK1_{csp(s)}$ according to the following formula to obtain the frequency-wavenumber domain data $FK1_{csp(s)}$:

$$FK1_{csp(s)}(f, k) = \sum_{m=}^{M-1} TK1_{csp(s)}(m\Delta t, k)e^{jfm\Delta t}\Delta t$$

S403: the receiver points are arranged uniformly in the arrangement range of the receiver points according to a set quantity of irregular sparse collection receiver points, each receiver point is enabled to traverse all candidate grids in the disturbance range of the receiver points in turn, and a common shot point gather $D2_{csp(s)}$ corresponding to all the shot points under the distribution of the irregular sparse collection receiver points is obtained by forward modeling for each transform of the positions of the receiver points, where s is a serial number of a shot point; and a frequency-wavenumber spectrum $FK2_{csp(s)}$ corresponding to the $D2_{csp(s)}$ is computed, where s is the serial number of the shot point. Specific steps are as follows:

Due to uniform temporal sampling points and non-uniform spatial sampling points of the common shot point gather $D2_{csp(s)}$ obtained by forward modeling on the irregular distribution of the receiver points, discrete non-uniform Fourier transform is performed on a spatial direction of the $D2_{csp(s)}$ according to the following formula to obtain time-wavenumber domain data $TK2_{csp(s)}$:

$$TK2_{csp(s)}(t, k) = \sum_{n=0}^{N-1} D2_{csp(s)}(t, x_n) e^{jkx_n} \Delta x_n$$

where $$\Delta x_n = \frac{x_{n+1} - x_{n-1}}{2};$$

then discrete uniform Fourier transform is performed on a temporal direction of the time-wavenumber domain data $TK2_{csp(s)}$ according to the following formula to obtain frequency-wavenumber domain data $FK2_{csp(s)}$:

$$FK2_{csp(s)}(f, k) = \sum_{m=1}^{M-1} TK2_{csp(s)}(m\Delta t, k) e^{jfm\Delta t} \Delta t$$

An average value $[[\sigma_{csp}]]\sigma_{csp}$ of frequency-wavenumber spectrum errors of the regular high-density common shot point gathers and the irregular sparse common shot point gathers of all the shot points is computed according to the following formula:

$$\sigma_{csp} = \frac{1}{s} \sum_{s=1}^{S} \sum_{i=1}^{p} \sum_{j=1}^{q} (FK1_{csp(s)}(i, j) - FK2_{csp(s)}(i, j))^2$$

where S is a total number of the shot points, and p and q are dimensions in the frequency direction and the wavenumber direction of the frequency-wavenumber spectrum, respectively; the grid corresponding to a minimum average value is used as an arrangement position of the receiver point; the disturbances of the receiver points stop when the average value of the frequency-wavenumber spectrum errors of the regular high-density common shot point gathers and the irregular sparse common shot point gathers of all the shot points cannot be decreased; and S404: preferred irregular arrangement positions of the receiver points are output; and S5: a preferred irregular sparse observation system is output:

The irregular arrangement positions of the shot points output in S3 and the irregular arrangement positions of the receiver points output in S4 are combined to obtain the irregular sparse observation system including the arrangement parameters of the receiver points and the shot points.

Figure 4:
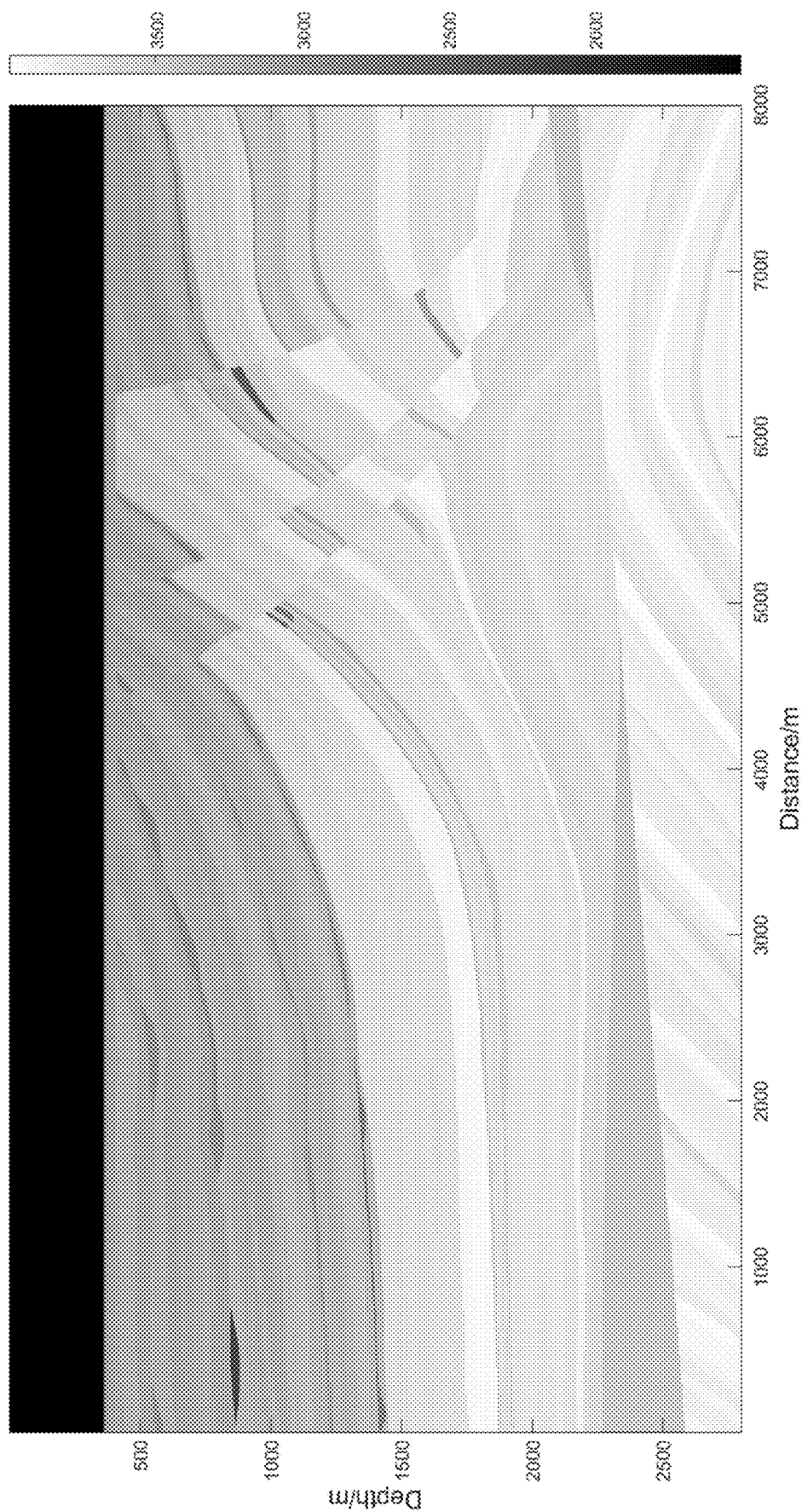
FIG. 4 is a schematic diagram of a marmousi model.
Figure 5:
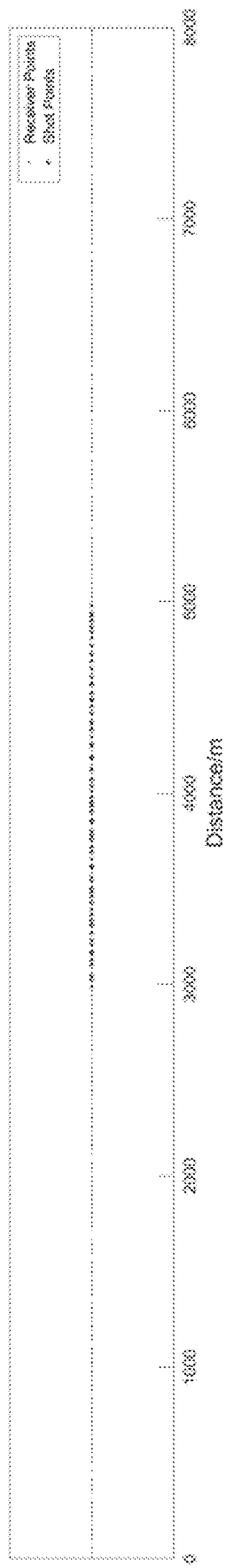
FIG. 5 is a schematic diagram of a preferred irregular sparse observation system.

Implementation Effects:

A marmousi model with a complex structure of faults, anticlines, and the like is used as a geological model for a work area to verify application effects of the present invention. As shown in FIG. 4, the model has a length of 8000 m and a depth of 2800 m.

Regular high-density collection plans to arrange 1000 tracks of receiver points in the entire work area and 200 tracks of shot points in a range of 3000-5000 m; and irregular sparse collection plans to arrange 500 tracks of receiver points in the entire work area with a disturbance range of 16 m and 100 tracks of shot points in a range of 3000-5000 m with a disturbance range of 20 m, with 8000 grids for the receiver points and 2000 grids for the shot points, where the spacing between the grids is 1 m. The irregular sparse observation system preferred by using the irregular seismic data collection method provided in the present invention, shown in FIG. 5, includes irregular arrangement positions of the receiver points and the shot points.

To explain good application effects of the preferred irregular observation system of the present invention, the $100^{th}$ shot point is used as an example for forward modeling of high-density and sparse seismic data collection.

Figure 6:
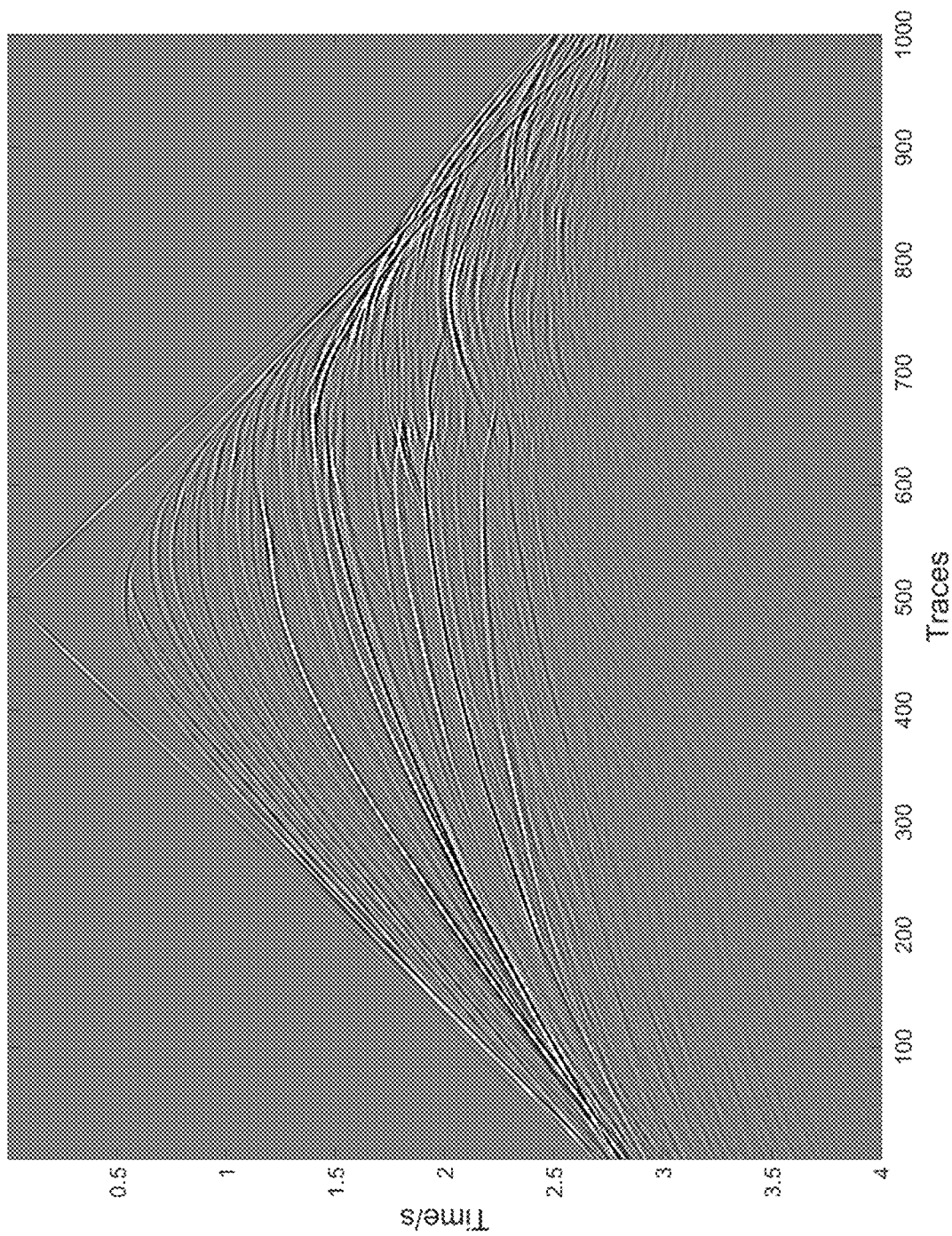
FIG. 6 is a schematic diagram of a regular high-density common shot point gather corresponding to the $100^{th}$ shot point.
Figure 7:
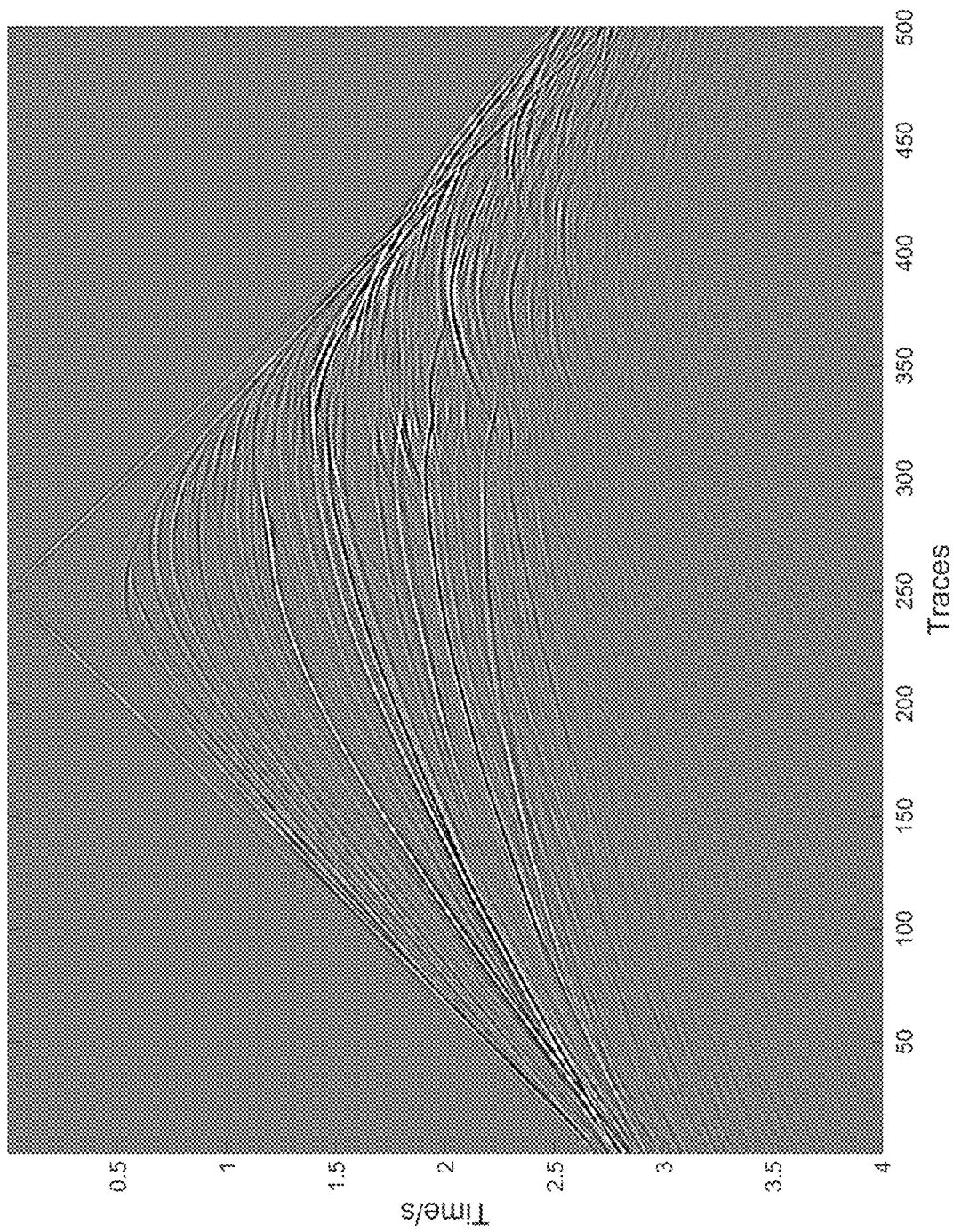
FIG. 7 is a schematic diagram of a regular sparse common shot point gather corresponding to the $100^{th}$ shot point.
Figure 8:
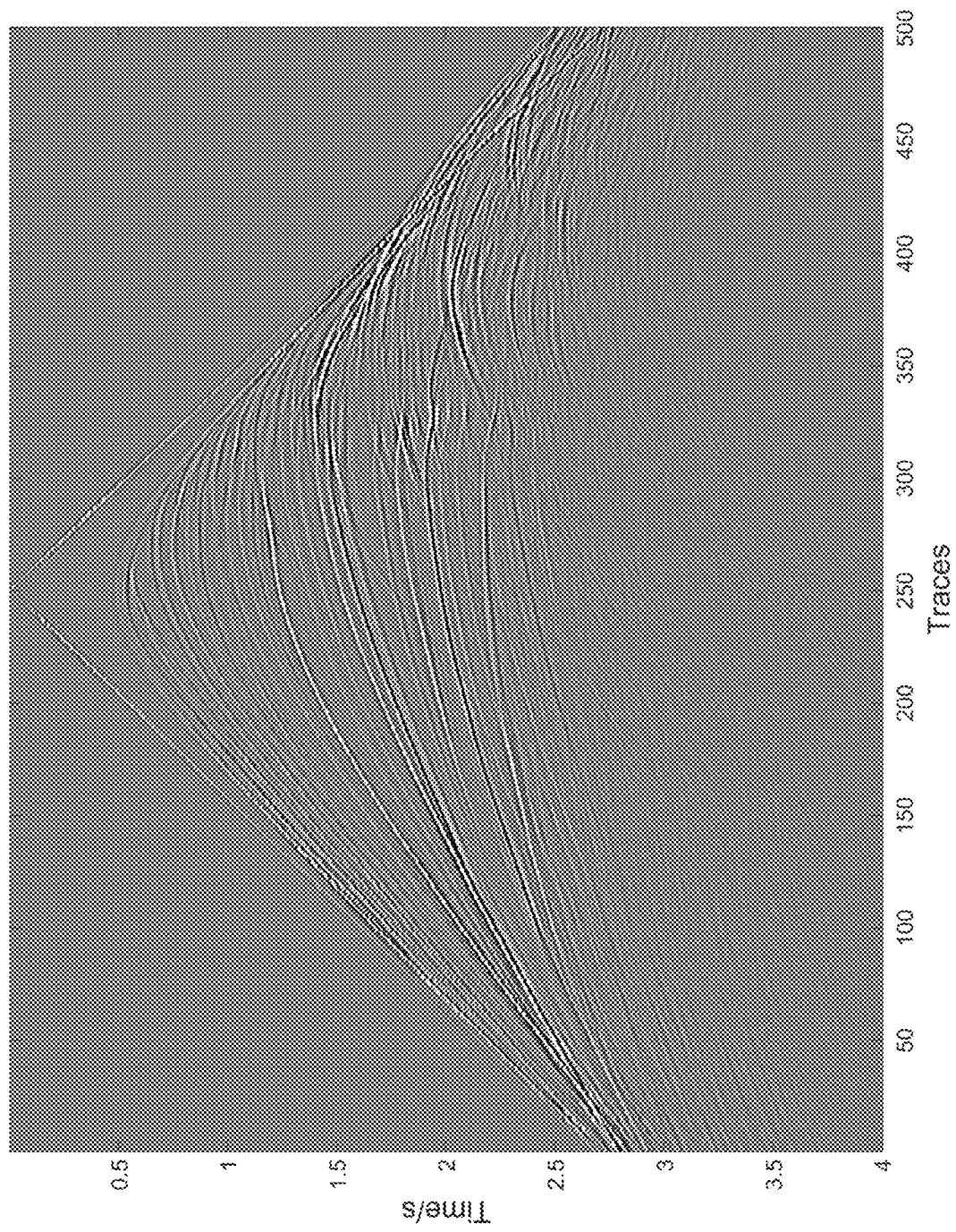
FIG. 8 is a schematic diagram of an irregular sparse common shot point gather corresponding to the $100^{th}$ shot point.
Figure 9:
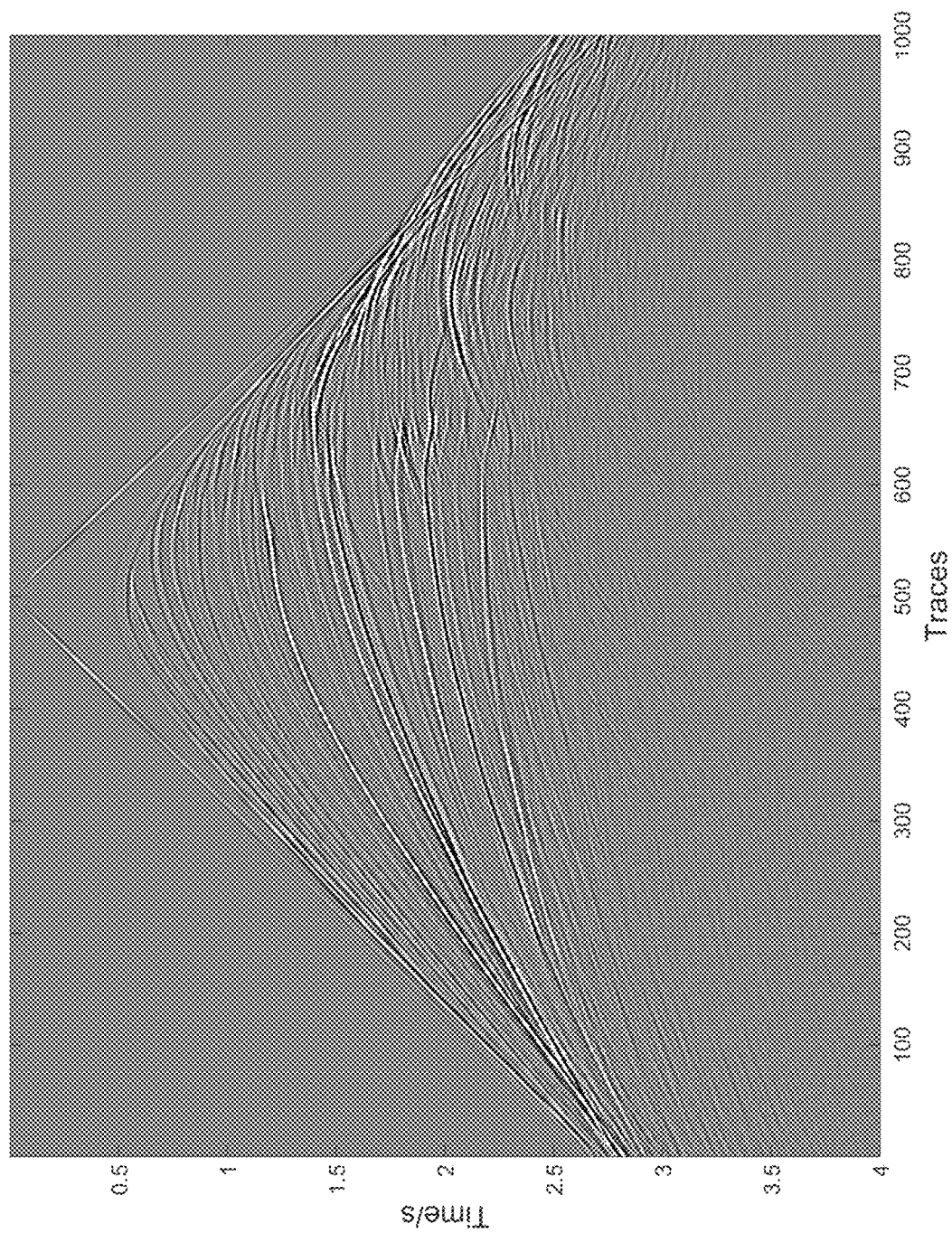
FIG. 9 is a schematic diagram of a reconstructed regular high-density common shot point gather corresponding to the $100^{th}$ shot point.
Figure 10:
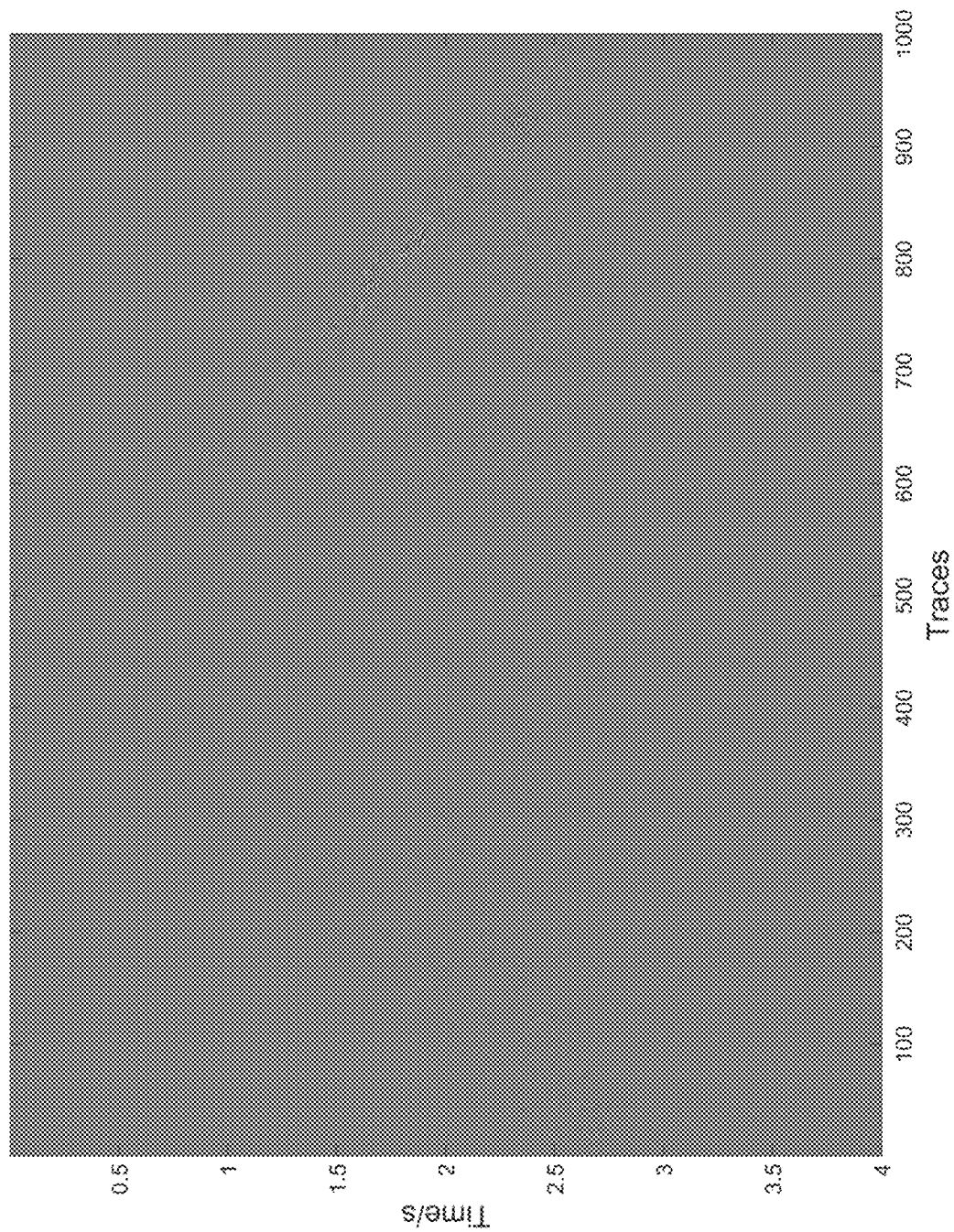
FIG. 10 is a schematic diagram of a differential profile of the regular high-density common shot point gather and the reconstructed regular high-density common shot point gather corresponding to the $100^{th}$ shot point.
Figure 11:
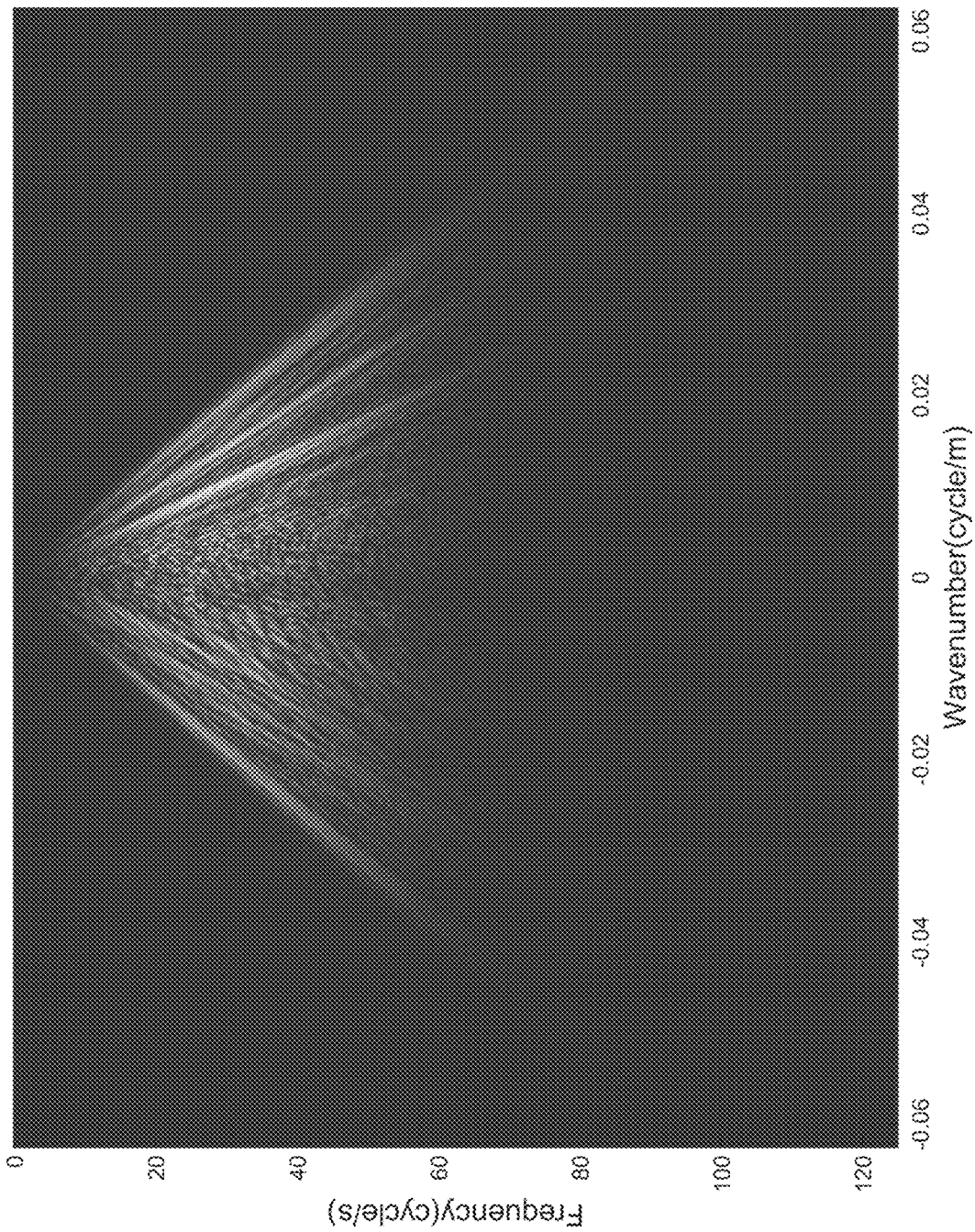
FIG. 11 is a schematic diagram of a frequency-wavenumber spectrum corresponding to the regular high-density common shot point gather shown in FIG. 6.
Figure 12:
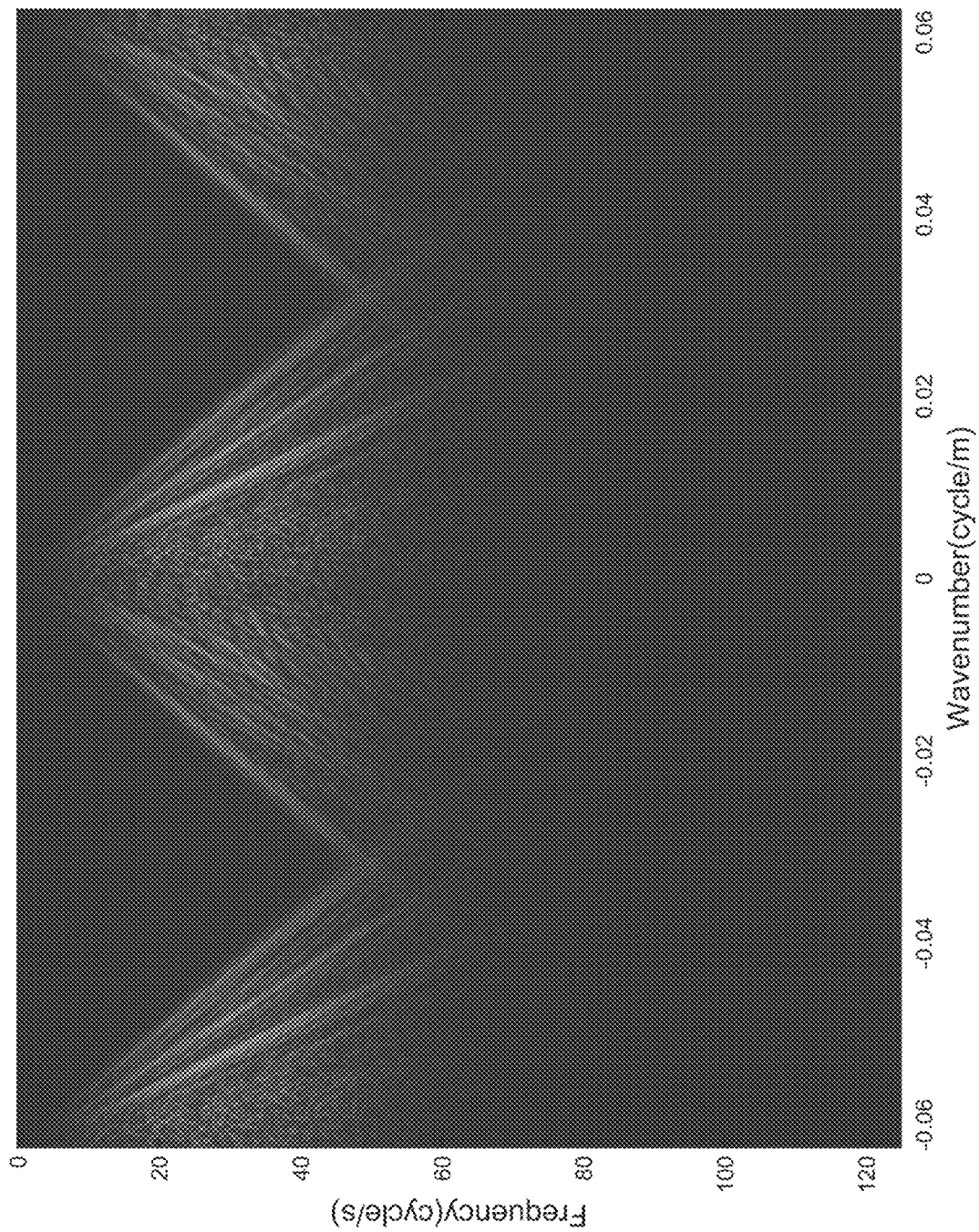
FIG. 12 is a schematic diagram of a frequency-wavenumber spectrum corresponding to the regular sparse common shot point gather shown in FIG. 7.
Figure 13:
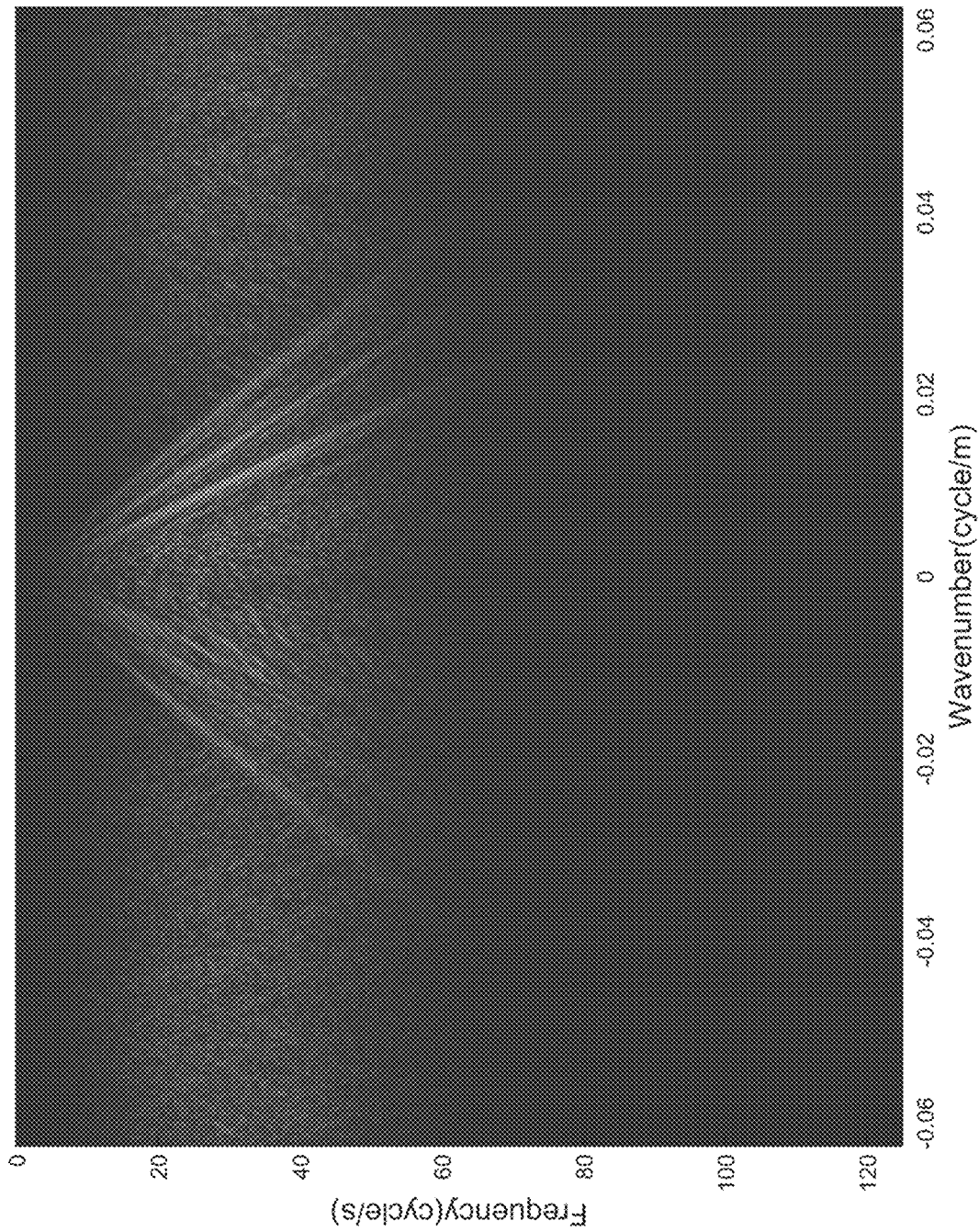
FIG. 13 is a schematic diagram of a frequency-wavenumber spectrum corresponding to the irregular sparse common shot point gather shown in FIG. 8.
Figure 14:
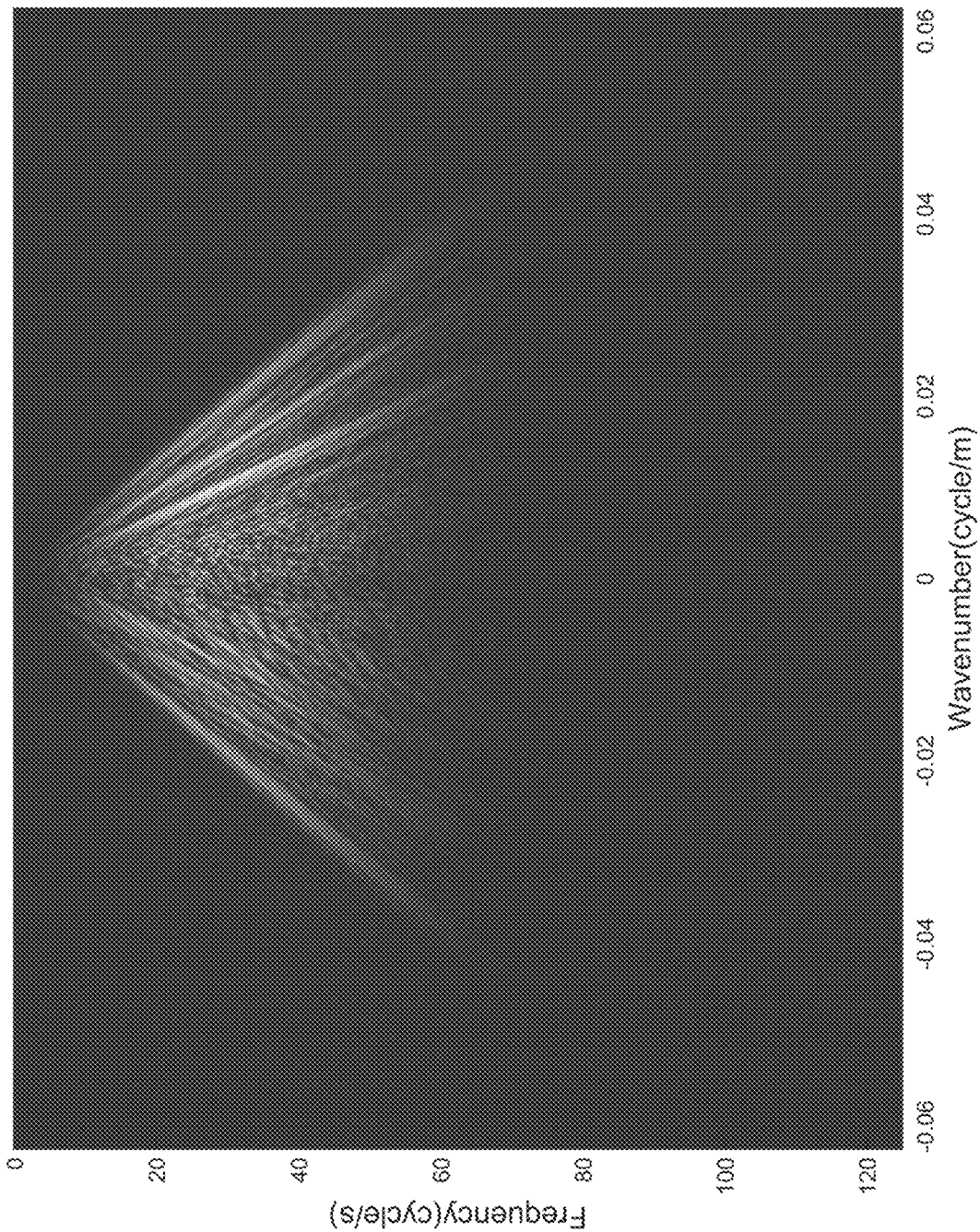
FIG. 14 is a schematic diagram of a frequency-wavenumber spectrum corresponding to the reconstructed regular high-density common shot point gather shown in FIG. 9.

First, a regular high-density common shot point gather is obtained through forward modeling, as shown in FIG. 6, with track spacing of 8 m and totally 1000 receiver points, indicating good continuity of events. During low-density collection, if the receiver points are arranged regularly, a regular sparse common shot point gather may be obtained through forward modeling, as shown in FIG. 7, with track spacing of 16 m and totally 500 receiver points, indicating poor continuity of events, which affects subsequent processing and interpretation of seismic data. An irregular sparse common shot point gather may be obtained by forward modeling the irregular arrangement positions of receiver points preferred by the present invention, as shown in FIG. 8, with average track spacing of 16 m and totally 500 receiver points, indicating poor continuity of events, which also affects subsequent processing and interpretation of seismic data. The irregular sparse common shot point gather shown in FIG. 8 is reconstructed and recovered to obtain a regular high-density common shot point gather, as shown in FIG. 9, with track spacing of 8 m and totally 1000 receiver points, indicating good continuity of events. The difference between the regular high-density common shot point gather shown in FIG. 6 and the reconstructed regular high-density common shot point gather shown in FIG. 9 is solved to obtain a differential profile, as shown in FIG. 10, where a very small amplitude difference is seen, indicating that a regular high-density seismic record may be obtained by reconstructing an irregular sparse seismic record, with a good reconstruction effect.

Figure 15:
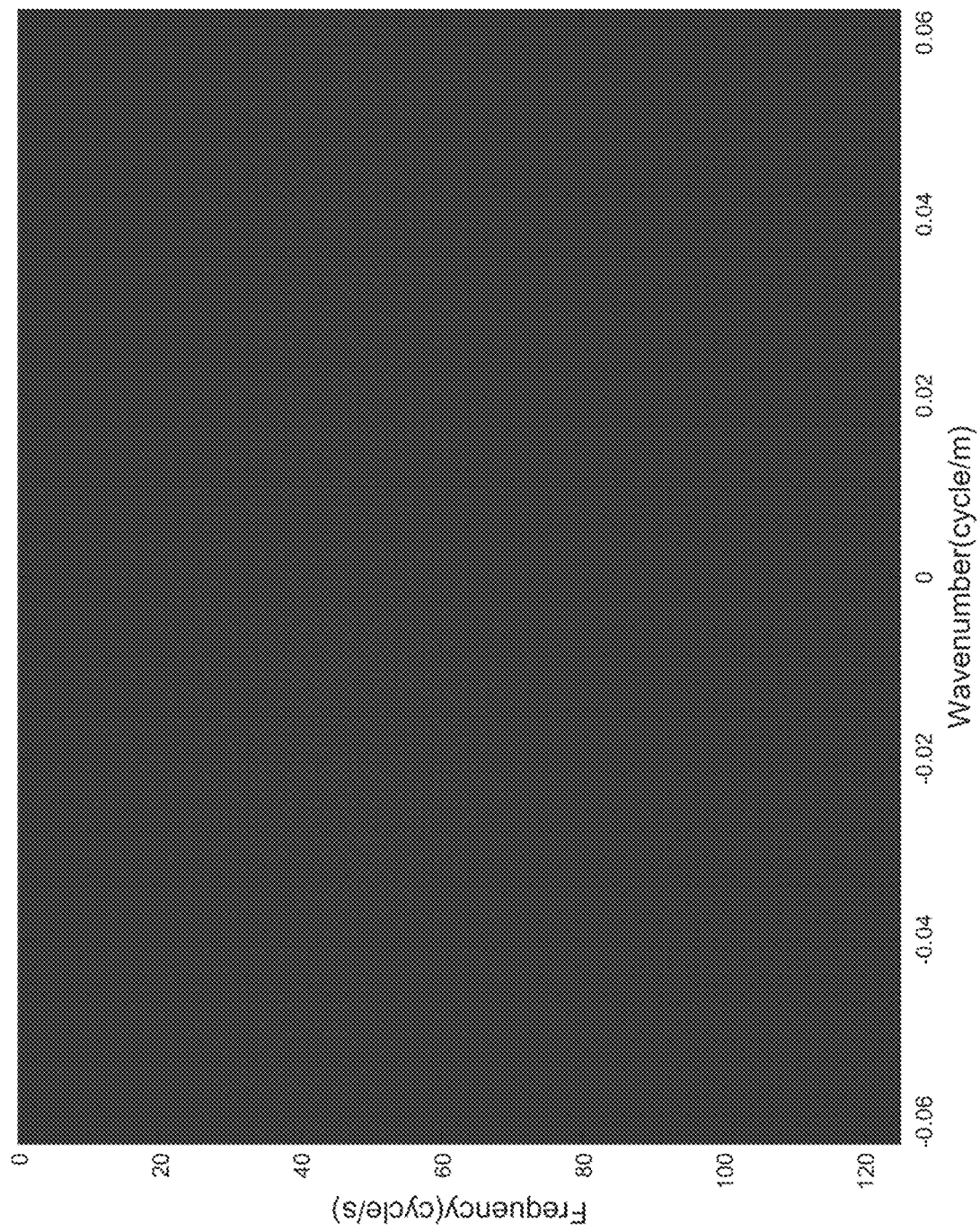
FIG. 15 is a schematic diagram of a differential profile between the frequency-wavenumber spectrum of the regular high-density common shot point gather shown in FIG. 11 and the frequency-wavenumber spectrum of the reconstructed regular high-density common shot point gather shown in FIG. 14.

FIGS. 11-14 show frequency-wavenumber spectra corresponding to the regular high-density common shot point gather, the regular sparse common shot point gather, the irregular sparse common shot point gather, and the reconstructed regular high-density common shot point gather in FIGS. 6-9, respectively. The frequency-wavenumber spectrum of the regular high-density common shot point gather, shown in FIG. 11, has no spatial aliasing, does not affect subsequent processing of seismic data, and is an ideal frequency-wavenumber spectrum of a seismic record. The frequency-wavenumber spectrum of the regular sparse common shot point gather, shown in FIG. 12, has serious spatial aliasing, which cannot be directly removed and affects subsequent processing and interpretation of seismic data. The frequency-wavenumber spectrum of the irregular sparse common shot point gather, shown in FIG. 13, converts the spatial aliasing in FIG. 12 into random noise uniformly distributed in the spectrum. The random noise in the frequency-wavenumber spectrum corresponding to the reconstructed regular high-density common shot point gather, shown in FIG. 14, disappears. FIG. 15 shows the difference between the frequency-wavenumber spectrum of the regular high-density common shot point gather corresponding to FIG. 11 and the frequency-wavenumber spectrum of the reconstructed regular high-density common shot point gather corresponding to FIG. 14, indicating good amplitude consistency between the frequency-wavenumber spectra corresponding to the reconstructed regular high-density common shot point gather and the original regular high-density common shot point gather, which can also explain that the irregular sparse collection scheme for seismic data, designed by the present invention, can guarantee perfect reconstruction of irregular sparse seismic data. Therefore, the irregular seismic data collection method provided by the present invention can collect underground information to the maximum extent with as few receiver points as possible, and regular high-density seismic data may be accurately reconstructed from the collected irregular sparse seismic data by solving a sparse constrained optimization algorithm, with good application effects and high application value.

Embodiments of the present invention are described above, but the scope of the present invention is not only limited thereto. Users may make various changes and implement them within the scope of the main idea of the present invention, but all are included in the scope of protection of the patent.

The present invention addresses, on the whole, effects of geological conditions in the work area on regular high-density collection of seismic data. The irregular optimization design on the positions of the shot points and the receiver points based on the forward modeling technology by using the greedy strategy decomposes a global optimization problem into local optimization problems, which can obtain an ideal irregular sparse observation system within limited computing time, so as to guarantee accurate reconstruction of regular high-density seismic data.

The invention claimed is:

1. An irregular seismic data collection method based on forward modeling, comprising the following steps:

S1: fully collecting geological information of a work area to build a geological model:
collecting previous geological and geophysical exploration data, obtaining underground information of the work area such as formation velocity, geological structure, anisotropy, and absorption attenuation by using logging data and gravity, magnetic, electrical, and seismic data, and building a high-precision geological model to guarantee accuracy of subsequent forward modeling of seismic data;

S2: determining arrangement parameters of receiver points and shot points for regular high-density collection and irregular sparse collection:
determining arrangement ranges and quantities of the receiver points and the shot points for regular high-density collection, and arrangement ranges, disturbance ranges, quantities, numbers of grids and spacing between the grids of the receiver points and the shot points for irregular sparse collection, and using all the grids as candidate excitation points or sampling points;

S3: performing irregular optimization design on positions of the shot points based on forward modeling:
performing the irregular optimization design on the positions of the shot points based on a high-precision seismic forward modeling technology by using a greedy strategy, to decompose a global optimization problem of arrangement of the shot points into local optimization problems of single shot points, wherein specific steps are as follows:

S301: arranging a receiver point in a center of the arrangement range of the receiver points;

S302: arranging regular high-density shot points in the arrangement range of the shot points, obtaining a regular high-density common receiver point gather $D1_{crp}$ by using the forward modeling technology, and computing a frequency-wavenumber spectrum $FK1_{crp}$ corresponding to the $D1_{crp}$;

due to regular distribution of temporal sampling points and spatial sampling points of the common receiver point gather corresponding to distribution of the regular high-density shot points, performing discrete uniform Fourier transform on a spatial direction of the $D1_{crp}$ according to the following formula to obtain time-wavenumber domain data $TK1_{crp}$:

$$TK1_{crp}(t, k) = \sum_{n=1}^{N-1} D1_{crp}(t, n\Delta x)e^{jkn\Delta x}\Delta x$$

wherein N is a dimension in the spatial direction, t is time, $n\Delta x$ is a spatial position of an $n^{th}$ sampling point, $\Delta x$ is a spatial sampling spacing, k is wavenumber; then performing discrete uniform Fourier transform on a temporal direction of the time-wavenumber domain data $TK1_{crp}$ according to the following formula to obtain the frequency-wavenumber domain data $FK1_{crp}$:

$$FK1_{crp}(f, k) = \sum_{m=1}^{M-1} TK1_{crp}(m\Delta t, k)e^{jfm\Delta t}\Delta t$$

wherein M is a dimension in the temporal direction and f is frequency;

S303: arranging the shot points uniformly in the arrangement range of the shot points according to a set quantity of irregular sparse collection shot points, enabling each shot point to traverse all candidate grids in the disturbance range of the shot points in turn, obtaining a common receiver point gather $D2_{crp}$ corresponding to current distribution of the shot points in each disturbance by using the forward modeling technology, and computing a frequency-wavenumber spectrum $FK2_{crp}$ corresponding to the $D2_{crp}$, wherein specific steps are as follows:

due to uniform temporal sampling points and non-uniform spatial sampling points of the common receiver point gather $D2_{crp}$ obtained by the forward modeling of irregular distribution of the shot points, performing discrete non-uniform Fourier transform on a spatial direction of the $D2_{crp}$ according to the following formula to obtain time-wavenumber domain data $TK2_{crp}$:

$$TK2_{crp}(t, k) = \sum_{n=0}^{N-1} D2_{crp}(t, x_n)e^{jkx_n}\Delta x_n$$

wherein $$\Delta x_n = \frac{x_{n+1} - x_{n-1}}{2},$$

and N is a dimension in the spatial direction, k is the wavenumber, and $x_n$ is a spatial position of a non-uniform sampling point then performing discrete uniform Fourier transform on a temporal direction of the time-wavenumber domain data $TK2_{crp}$ according to the following formula to obtain frequency-wavenumber domain data $FK2_{crp}$:

$$FK2_{crp}(f, k) = \sum_{m=1}^{M-1} TK2_{crp}(m\Delta t, k)e^{jfm\Delta t}\Delta t$$

wherein M is a dimension in the temporal direction;
using a grid corresponding to a minimum error $\sigma_{crp}$ of the frequency-wavenumber spectrum $FK1_{crp}$ in S302 as an arrangement position of the shot point, wherein the error $\sigma_{crp}$ is computed according to the following formula:

$$\sigma_{crp} = \sum_{i=1}^{p} \sum_{j=1}^{q=1} (FK1_{crp}(i,j) - FK2_{crp}(i,j))^2$$

wherein p and q are dimensions in a frequency direction and a wavenumber direction of the frequency-wavenumber spectrum and i and j are serial numbers of a data point in the frequency direction and the wavenumber direction of the frequency-wavenumber spectrum, respectively; stopping the disturbances of the shot points when the error cannot be decreased by disturbing any shot point; and S304: outputting preferred irregular arrangement positions of the shot points;

S4: performing irregular optimization design on positions of the receiver points based on forward modeling:
performing the irregular optimization design on the positions of the receiver points based on the high-precision seismic forward modeling technology by using the greedy strategy, to decompose a global optimization problem of arrangement of the receiver points into local optimization problems of single receiver points, wherein specific steps are as follows:

S401: arranging the shot points in the work area according to the irregular positions of the shot points in S3;

S402: arranging regular high-density receiver points in the arrangement range of the receiver points in the work area, and performing forward modeling for each shot point to obtain a common shot point gather $D1_{csp(s)}$, wherein s is a serial number of the shot point; and computing a frequency-wavenumber spectrum $FK1_{csp(s)}$ corresponding to each common shot point gather;

due to regular distribution of temporal sampling points and spatial sampling points of the common shot point gather corresponding to distribution of the regular high-density receiver points, performing discrete uniform Fourier transform on a spatial direction of the $D1_{csp(s)}$ according to the following formula to obtain time-wave number domain data $TK1_{csp(s)}$:

$$TK1_{csp(s)}(t, k) = \sum_{n=0}^{N-1} D1_{csp(s)}(t, x_n)e^{jkx_n}\Delta x_n$$

wherein the t is a sequence of the temporal sampling points, the k is a wavenumber, and the x is an arrangement position of a spatial sampling point;
then performing discrete uniform Fourier transform on a temporal direction of the time-wavenumber domain data $TK1_{csp(s)}$ according to the following formula to obtain frequency-wavenumber domain data $FK1_{csp(s)}$:

$$FK1_{csp(s)}(f, k) = \sum_{m=1}^{M-1} TK1_{csp(s)}(m\Delta t, k)e^{jfm\Delta t}\Delta t$$

S403: arranging the receiver points uniformly in the arrangement range of the receiver points according to a set quantity of irregular sparse collection receiver points, enabling each receiver point to traverse all candidate grids in the disturbance range of the receiver points in turn, and obtaining a common shot point gather $D2_{csp(s)}$ corresponding to all the shot points under the distribution of the irregular sparse collection receiver points by forward modeling for each transform of the positions of the receiver points, wherein s is a serial number of a shot point; and computing a frequency-wavenumber spectrum $FK2_{csp(s)}$ corresponding to the $D2_{csp(s)}$, wherein s is the serial number of the shot point, wherein specific steps are as follows:

due to uniform temporal sampling points and non-uniform spatial sampling points of the common shot point gather $D2_{csp(s)}$ obtained by forward modeling the irregular distribution of the receiver points, performing discrete non-uniform Fourier transform on a spatial direction of the $D2_{csp(s)}$ according to the following formula to obtain time-wavenumber domain data $TK2_{csp(s)}$:

$$TK2_{csp(s)}(t, k) = \sum_{n=0}^{N-1} D2_{csp(s)}(t, x_n)e^{jkx_n}\Delta x_n$$

wherein $$\Delta x_n = \frac{x_{n+1} - x_{n-1}}{2};$$

then performing discrete uniform Fourier transform on a temporal direction of the time-wavenumber domain data $TK2_{csp(s)}$ according to the following formula to obtain frequency-wavenumber domain data $FK2_{csp(s)}$:

$$FK2_{csp(s)}(f, k) = \sum_{m=1}^{M-1} TK2_{csp(s)}(m\Delta t, k)e^{jfm\Delta t}\Delta t$$

computing an average value $\sigma_{csp}$ of frequency-wavenumber spectrum errors of the regular high-density common shot point gathers and the irregular sparse common shot point gathers of all the shot points according to the following formula:

$$\sigma_{csp} = \frac{1}{S}\sum_{s=1}^{S} \sum_{i=1}^{p} \sum_{j=1}^{q} (FK1_{csp(s)}(i,j) - FK2_{csp(s)}(i,j))^2$$

wherein S is a total number of the shot points, and p and q are dimensions in the frequency direction and the wavenumber direction of the frequency-wavenumber spectrum, respectively; using the grid corresponding to a minimum average value as an arrangement position of the receiver point; and stopping the disturbances of the receiver points when the average value of the frequency-wavenumber spectrum errors of the regular high-density common shot point gathers and the irregular sparse common shot point gathers of all the shot points cannot be decreased; and S404: outputting preferred irregular arrangement positions of the receiver points; and S5: outputting a preferred irregular sparse observation system:

combining the irregular arrangement positions of the shot points output in S3 and the irregular arrangement positions of the receiver points output in S4 to obtain the irregular sparse observation system comprising the arrangement parameters of the receiver points and the shot points.

\* \* \* \* \*